United States Patent [19]
Drumm

[11] Patent Number: 5,363,120
[45] Date of Patent: * Nov. 8, 1994

[54] COMPUTER INPUT DEVICE USING ORIENTATION SENSOR

[75] Inventor: Donald E. Drumm, Billerica, Mass.

[73] Assignee: Wang Laboratories, Inc., Lowell, Mass.

[ * ] Notice: The portion of the term of this patent subsequent to Nov. 26, 2008 has been disclaimed.

[21] Appl. No.: 128,043

[22] Filed: Sep. 27, 1993

Related U.S. Application Data

[63] Continuation of Ser. No. 719,658, Jun. 24, 1991, abandoned, which is a continuation of Ser. No. 418,895, Oct. 4, 1989, abandoned, which is a continuation of Ser. No. 108,176, Oct. 14, 1987, abandoned.

[51] Int. Cl.$^5$ .............................................. G09G 1/00
[52] U.S. Cl. .................................... 345/158; 341/20; 345/166
[58] Field of Search ............... 345/163, 164, 165, 166, 345/157, 158; 340/686, 689; 349/20, 21; 73/653, 655, 505; 200/52 A, 61.45 R, 61.52, 6 A, 61.46, 61.47, 61.83, 61.1, 220; 273/148 B; 250/221, 573, 574, 575, 577; 33/365, 366, 377

[56] References Cited

U.S. PATENT DOCUMENTS

| | | | |
|---|---|---|---|
| 3,464,276 | 9/1969 | Leibert | 33/377 |
| 3,643,148 | 2/1972 | Brown et al. | 340/710 |
| 4,024,823 | 5/1977 | Ward et al. | 33/366 |
| 4,209,255 | 6/1980 | Heynau et al. | 340/707 |
| 4,214,485 | 7/1980 | Berger et al. | 340/689 |
| 4,307,516 | 12/1981 | Walker | 33/366 |
| 4,445,011 | 4/1984 | Hansen | 200/220 |
| 4,450,325 | 5/1984 | Lugue . | |
| 4,503,299 | 3/1985 | Henrard et al. | 200/61.52 |
| 4,524,348 | 6/1985 | Lefkowitz | 340/724 |
| 4,550,250 | 10/1985 | Mueller et al. | 340/710 |
| 4,565,999 | 1/1986 | King et al. | 340/707 |
| 4,567,479 | 1/1986 | Boyd | 340/709 |
| 4,590,680 | 5/1986 | Hanchett et al. | 33/366 |
| 4,698,626 | 10/1987 | Sato et al. | 340/710 |
| 4,754,268 | 6/1988 | Mori | 340/710 |
| 4,862,172 | 8/1989 | Ross | 340/709 |

FOREIGN PATENT DOCUMENTS

| | | |
|---|---|---|
| 33537/78 | 2/1978 | Australia . |
| 490836 | 2/1978 | Australia . |
| 892801 | 2/1972 | Canada . |
| 1039406 | 9/1978 | Canada . |
| 1081342 | 7/1980 | Canada . |
| 0031637 | 2/1985 | Japan ............... 340/710 |

*Primary Examiner*—Donald J. Yusko
*Assistant Examiner*—Edwin C. Holloway, III
*Attorney, Agent, or Firm*—Kenneth L. Milik

[57] ABSTRACT

A hand-held device for controlling cursor movement on a data terminal having a display. An internal orientation sensor provides an electrical signal that is related to the orientation of the device without it being adjacent to any fixed surface. The orientation sensor includes a hollow spherical housing having at least one LED and one phototransistor mounted opposingly in the inner wall, along an axis extending through the center point of the housing. The housing is half-filled with a transparent liquid having a specified viscosity and index of refraction and half-filled with air. A light beam emitted from the LED is refracted upon passing through the boundary between the air and the liquid. As the orientation sensor rotates with respect to the vertical axis, the changing refraction angle of the light beam causes the phototransistor to detect changing intensities of light, which are representative of the angle of rotation.

24 Claims, 9 Drawing Sheets

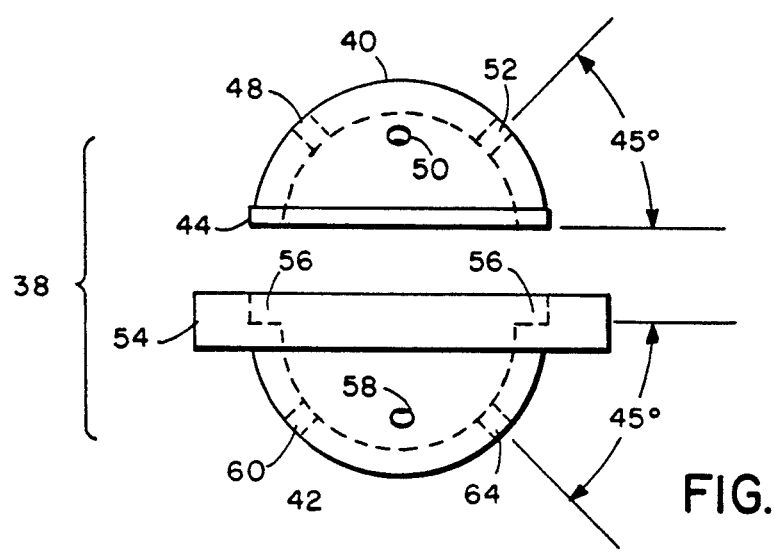
FIG. 3
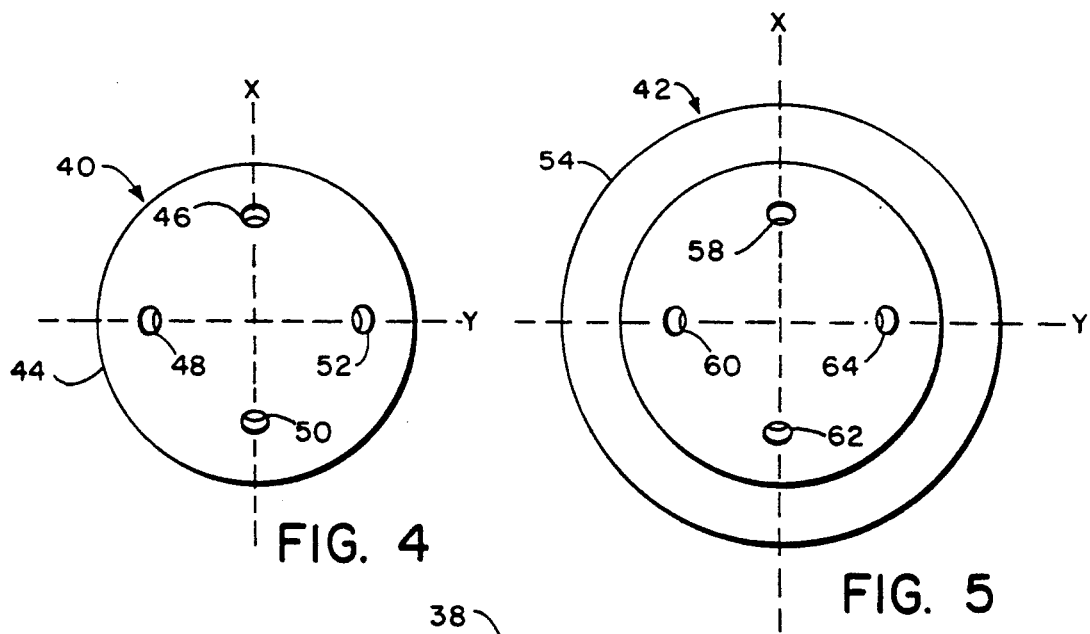
FIG. 4
FIG. 5
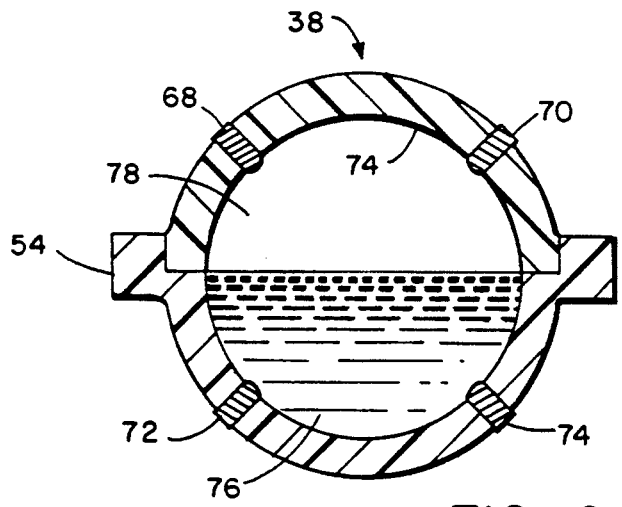
FIG. 6

COMPUTER INPUT DEVICE USING ORIENTATION SENSOR

This is a continuation of Ser. No. 07/719,658 filed Jun. 24, 1991, now abandoned which is a continuation of copending application filed on Jun. 24, 1991, now abandoned, which is a continuation of Ser. No. 07/418,895 filed Oct. 4, 1989 now abandoned, which is a continuation of Ser. No. 07/108,176 filed Oct. 14, 1987, now abandoned.

FIELD OF INVENTION

This invention relates to position or orientation sensors, and more particulary to an orientation sensor used to provide cursor control input to a computer system.

BACKGROUND

There are various devices known for positioning or controlling the movement of a cursor on a computer display screen. The most common in use is the conventional "mouse" device, which takes the form of a hand-sized housing which is moved over a flat desktop. Motion over the desktop is sensed by means of a mechanically rotating ball or optically reflective sensor, and digital data are generated which translate into corresponding motion of the cursor on the display screen. Other cursor positioning devices include the graphics input tablet which consists of a flat sensor pad and a hand-held pointing stylus which translates the analog motion of the pointing stylus into digitized data which is used to control the location of the cursor on the display screen. Still other cursor movement devices rely on focused light sources, held by the user or fixed on the user's person, as on a pilot's helmet. Sensors mounted around a display screen track the movement of the light beam and translate this movement into a corresponding movement of the cursor on the display screen.

Devices such as those discussed above are basically effective, although they suffer from certain disadvantages. Most cursor positioning and controlling devices have the disadvantage of requiring a fixed, generally level surface upon which to operate, or must operate in conjuction with a stationary sensor of some type; that is, motion is sensed with respect to a fixed medium and positional data signals are generated and presented to a computer for translation into a corresponding cursor movement. The need for a fixed surface or stationary sensor constrains how the user may interact with the display device. The user must normally sit close to the display screen and be provided with ample level desk space for placement of the graphics tablet or movement of the "mouse." In the case of the stationary sensor, the user must confine movement to keep the light beam within range of the sensor array.

The present invention overcomes the disadvantages of the prior art devices, such as the requirement for a flat desktop or confined movement of a user.

SUMMARY OF INVENTION

In accordance with the present invention, a novel computer input device is provided for a computer display unit having a display screen. The computer input device includes an orientation sensor which generates an electrical signal representative of the physical orientation of the device, without it being adjacent to any fixed surface, and the electrical signal is used to position and otherwise control a cursor on the display screen. The computer input device is held in the user's hand, and by simple angular or rotational movements of the device, the user effects corresponding movement of the cursor.

The orientation sensor operates on the principle of a light beam being refracted as it passes from one transparent medium to another. The orientation sensor includes a hollow spherical housing, with a defined vertical axis passing through its center point. Contained within the spherical housing are two fluid media. The first medium is gaseous and the second medium is liquid, and each has a predetermined viscosity and a different index of refraction. The liquid medium fills the spherical housing to the one-half level and the boundary between the liquid and gas intersects the center point of the spherical housing.

A light source in the form of an LED, and a photodetector in the form of a phototransistor are mounted opposingly in the inner wall of the spherical housing on an axis that extends through the center point of the housing, such that light emitted from the light source must first pass through the center point of the spherical housing before being detected by the photodetector. The light source emits a focused beam and the photodetector receives the focused beam and generates an analog voltage representative of the intensity of the beam, as it is received by the photodetector.

When the focused beam emitted from the light source passes through the boundary between the gaseous and liquid media, refraction of the beam occurs at the boundary at an angle which is determined by the angle at which the incident light beam intersects the boundary. If the spherical housing is oriented so that the incident light beam is perpendicular to the boundary, the light beam will not be refracted at all. The photodetector will receive the full intensity of the light beam, and will generate a maximum ouput voltage. As the spherical housing is rotated with respect to the vertical axis, the angle from the vertical axis to the incident light beam will increase, and the refraction angle of the light beam will increase. As the refraction angle increases, the photodetector receives a decreasing portion of the light beam, and the photodetector generates a decreasing voltage. The output voltage of the photodetector is therefore representative of the angle at which the incident beam intersects the boundary between the two media. The liquid medium always flows to the bottom half of the spherical housing to maintain equilibrium.

In the preferred form of the present invention, the orientation sensor includes four light source/photodetector pairs, each pair mounted opposingly on axes passing through the center point of the spherical housing. The four light source/photodetector pairs are positioned 90 degrees apart. The light sources are mounted on the same side of the spherical housing, the photodetectors are mounted on the opposite side, and the output voltages of the photodetectors are sensed differentially. In the normal orientation of the sensor, the light sources are located in the upper half of the spherical housing, exposed to the gaseous media, each 45 degrees above the horizontal axis. The photodetectors, in turn, are located in the lower part of the spherical housing, submerged in the liquid media, each 45 degrees the horizontal axis. Two coplanar light source/photodetector pairs define an X axis and the other two coplanar pairs define a Y axis. The output voltages for each pair of photodetectors within the same axis are compared in a differential amplifier, and the resultant output of the differential amplifier indicates the direction of rotation as well as the magnitude.

In the normal orientation of the sensor, with each device at 45 degrees from the horizontal and the surface of the liquid media, the voltage at the output of the differential amplifier is zero for both the X and Y axis. When the spherical housing is rotated plus or minus 45 degrees, the output of the differential amplifier becomes positive or negative, depending on the direction of rotation. The orientation sensor of the present invention determines rotation at any angle with respect to a defined vertical axis, with a single device.

The output signals of the orientation sensor are converted into digital data, formatted to simulate a cursor control device, and presented to a computer as control signals for positioning a cursor on a display screen. A user controls cursor movement by simple angular gestures of the hand.

In an alternative embodiment of the orientation sensor of the present invention, a hollow transparent sphere contains the two transparent media. The transparent sphere is disposed in an opaque spherical enclosure, which has light source/photodetector pairs mounted therein and oriented as described above. The light source/photodetector pairs contact the outer surface of the transparent sphere and function as in the above-described embodiment.

Beyond the uses hereabove described, the novel orientation sensor of the present invention could be used in any application in which the determination of angular rotation is required, such as clinometers, level sensing mechanisms, or feedback devices for robotic machines.

The present invention will be better understood from the following description when considered in conjunction with the accompanying drawings.

DESCRIPTION OF THE DRAWINGS

FIG. 3 illustrates a side view of the upper and lower hemispherical members, particulary showing their interrelationship;

FIG. 4 illustrates a top view of the upper hemispherical member, showing the relationship of the apertures to the X and Y axes;

FIG. 5 illustrates a bottom view of the lower hemispherical member, showing the relationship of the apertures to the X and Y axes;

FIG. 6 is a cross sectional view of the orientation sensor along the spherical housing X-axis shown in FIG. 4 and FIG. 5;

DESCRIPTION OF THE PREFERRED EMBODIMENT

Figure 1:
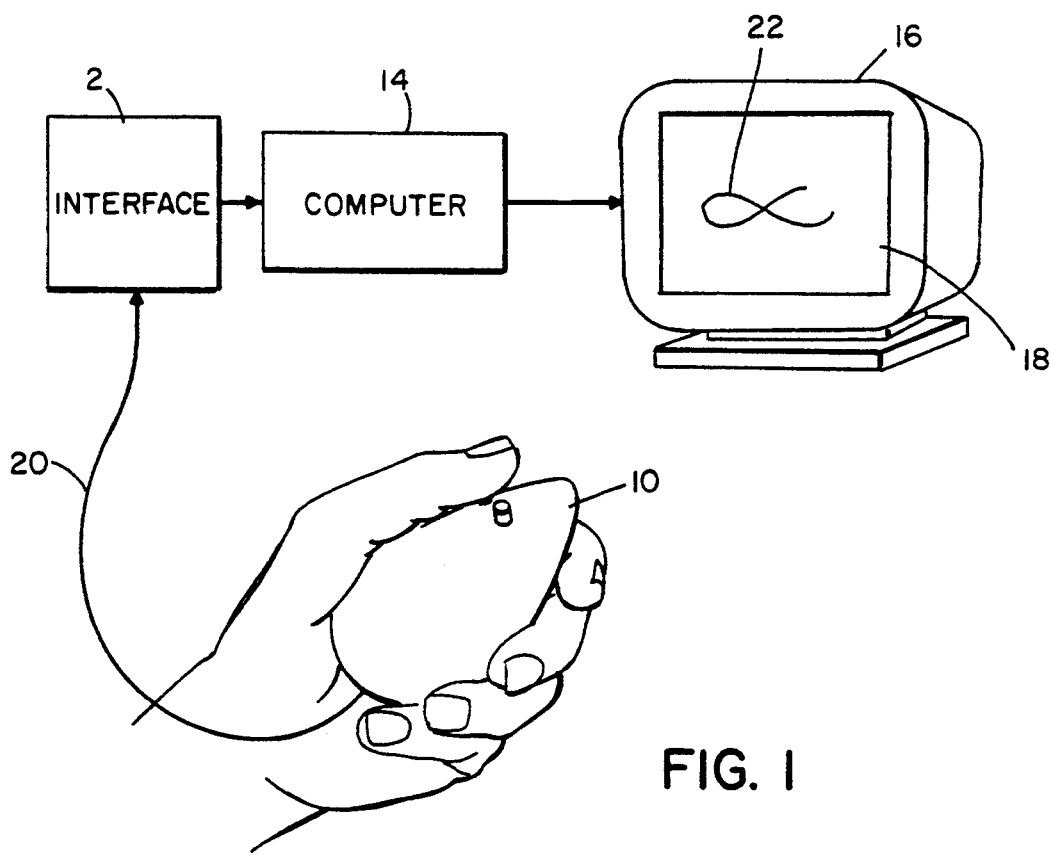
FIG. 1 is a simplified view of a graphics input system which uses the present invention.

FIG. 1 illustrates a graphics display system which embodies the computer input device of the present invention. The system includes a computer input device 10, an interface 12, a computer 14, and a display terminal unit 16 having a display screen 18.

The computer input device 10 is a hand-held unit and requires no physical contact with a flat desktop to operate. The computer input device 10 includes an orientation sensor which provides an electrical analog signal that is related to the angle of tilt of the sensor as determined in two axes. The user conveniently holds the device and, by changing orientation of the device by simple angular gestures, left-to-right, forward-to-back, or combinations of the two, the user effects a corresponding movement of a cursor displayed on the display screen 18. The computer input device 10 further includes circuitry to digitize the analog signals generated by the orientation sensor for processing by the interface 12 and transmission to the computer 14.

A cable 20 carries digitized signals from the computer input device 10 to the interface 12. The interface 12 contains a programmed microcontroller for receiving digitized signals from the computer input device 10 and translating those signals into control signals which can be interpreted by the computer 14, which in turn controls the display terminial unit 16. The interface 12 is programmed to simulate the operation of a graphics input device, and provides a standard RS-232C output to a conventional digital computer 14. This specific circuitry will be discussed in more detail in connection with FIG. 14.

In the preferred embodiment, the display screen 14 is a standard cathode ray tube, but any conventional display types may be used, such as plasmas or liquid crystals.

Also in the preferred embodiment, the computer input device 10 simulates the functioning of a graphics input tablet. A user can therefore make line drawings 22 on the display screen 18 as shown in FIG. 1. However, it is contemplated that other devices may be easily simulated, such as conventional "mouse." The manner in which the present invention operates will be discussed further in what follows.

Figure 2:
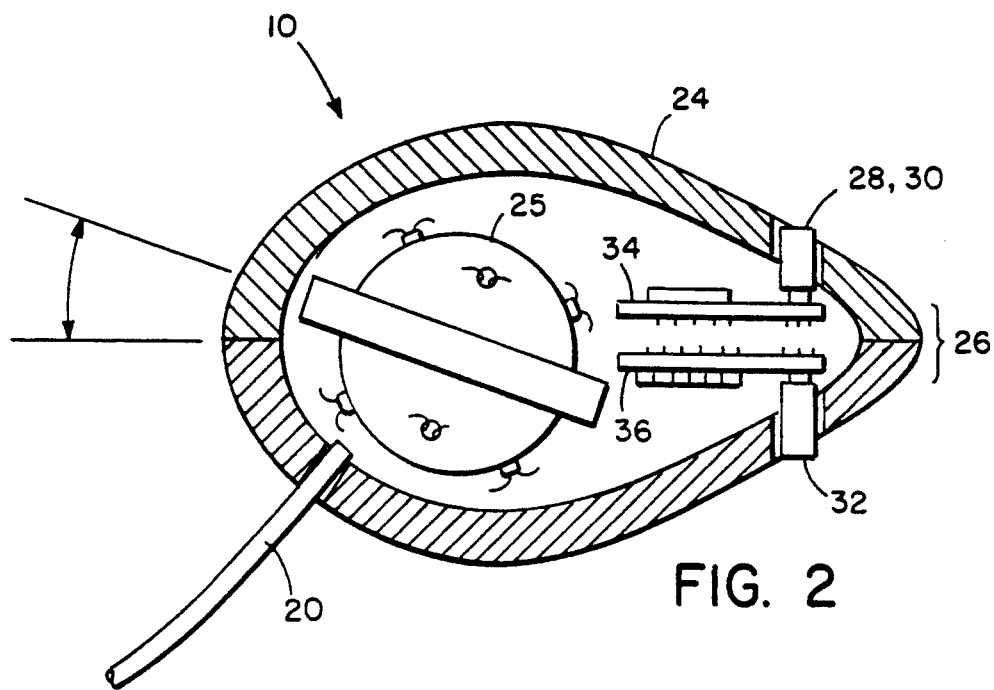
FIG. 2 is a diagramatic illustration in partial cross section of the present invention, showing the location of the internal components.

Turning now to FIG. 2, the external and internal components of the computer input device 10 are diagramatically illustrated. The computer input device 10 includes a housing 24, preferably molded of durable plastic, which is compact in size. In the preferred embodiment, the housing 10 is generally ovoid shaped to provide a comfortable grip to a user holding the computer input device 10 for prolonged time periods. The ovoid shape is further advantageous for housing a spherical orientation sensor 25 while keeping the computer input device 10 desirably small. In addition, the gradual tapering of the front portion 26 of the housing 24 provides a directional reference to the user for pointing at the display screen 18. It is understood, however, that housings having other shapes may also be desirable.

Two switches 28, 30 are mounted in parallel on the upper side of housing 24 adjacent to the front portion 26 and may be conveniently activated by a user's thumb pressure. Switch 28 provides a SELECT function; switch 30 provides a RETURN function. These functions are conventional for the manipulation of displayed data or graphics in a computer system having a "mouse" input device.

A trigger switch 32 is provided on the lower side of the housing 24 adjacent to the front portion 26. It is positioned so that it may be activated by the user's forefinger in operation of the computer input device 10. When the trigger switch 32 is engaged, a subroutine is initiated in the interface 12 which reduces the sensitivity of the computer input device 10, making it possible for the user to make finer, more controlled movements of the cursor on the display screen 18. As long as the trigger switch 32 is engaged, the subroutine will continue. The switches 28, 30 and the trigger switch 32 are all momentary contact microswitches, mechanically identical to those found in conventional "mouse" input devices.

Two printed circuit boards 34, 36 contain the electronic circuitry for the computer input device 10, the connection points for the switches 28, 30 and trigger switch 32, and interconnection wiring for the cable 20 which leads to the interface 12. For simplicity, the interconnection wiring is not shown in FIG. 2. The printed circuit boards 34, 36 include analog circuitry for the operation of the orientation sensor 25 and digital circuitry for communication with the interface 12. The specific circuitry will be discussed further on.

The cable 20 exits the lower rear portion of the housing 24, so that it will cause minimum interference during operation of the computer input device 10. Although direct cabling is used in the preferred embodiment to keep the computer input device 10 inexpensive, it is within the scope of the present invention to link the computer input device 10 to the interface 12 by means of conventional miniature transmitter technology.

The orientation sensor 25, which is a major component of the present invention, will be described in considerable detail. The orientation sensor 25 is fixedly mounted within the housing 24. As illustrated in FIG. 2, the orientation sensor 25 is mounted angularly forward. This angled mounting serves to improve the ergonomics of the computer input device 10. For a user holding the computer input device 10, the most comfortable holding position was found to be with the front portion 26 raised slightly. By mounting the orientation sensor 25 at the angle described, the orientation sensor 25 becomes level when the front portion 26 is raised to the desired position. The output voltage of the orientation sensor 25 and the resultant cursor motion on display screen 18 will then be null. This will be better appreciated by consideration of the structure of the orientation sensor 25 in the descriptions which follow.

FIGS. 3 through 6 illustrate the structure of the orientation sensor 25. The orientation sensor 25 includes a spherical housing 38 having upper and lower hemispherical members 40, 42 which mate together to form a hollow spherical enclosure. The upper hemispherical member 40 includes a circular ridge 44 and four apertures 46-52 which are spaced 45 degrees from the horizontal. The lower hemispherical member 42 includes a circular collar 54 and a circular recess 56 therein for receiving the circular ridge 44 when the upper and lower hemispherical members 40, 42 are mated to form the completed spherical housing 38. The lower hemispherical member includes four apertures 58-62 which correspond to those in the upper hemispherical member 40. These apertures 58-64 are also spaced 45 degrees from the horizontal as shown in FIG. 3.

The four apertures 46-52 in the upper hemispherical member define X and Y axes as shown in FIG. 4, and the same is true for the apertures 58-64 in the lower hemispherical member 42 as shown in FIG. 5. When the hemispherical members 40, 42 are mated, the apertures associated with each axis are precisely aligned.

The four apertures 46-52 in the upper hemispherical member 40 receive light sources or LEDs and the four apertures 58-64 in the lower hemispherical member receive photosensors or phototransistors. The LEDs and phototransistors are mounted with an adhesive which provides a liquid tight seal.

FIG. 6 presents a cross sectional view of the fully assembled orientation sensor 25 taken along the X axis shown in FIG. 4. Light emitting diodes 68, 70 are shown mounted in apertures 46 and 50, and phototransistors 72, 74 are shown mounted in apertures 58 and 62.

The spherical housing 38 is advantageously fabricated from Noryl, a plastic which is opaque with a non-reflective matte finish. It is particularly important for the inner wall 74 of the spherical housing 38 to be generally non-reflective, or proper operation of the orientation sensor 25 could be affected by stray reflections.

The LEDs 68, 70 are directly opposed to the phototransistors 74, 72 along the diameter of the spherical housing 38. Therefore light emitted from each LED would normally pass through a center point of the spherical housing 38 and be received by the opposite phototransistor. However, the spherical housing contains a transparent fluid 76 which refracts the light emitted in a manner which is central to the present invention.

The transparent fluid 76 has a desirable index of refraction and viscosity. The transparent fluid 76 fills the sphere to precisely the one-half level within the spherical housing 38. The properties considered important in the selection of the transparent fluid 76 are viscosity and index of refraction.

In response to tilting of the orientation sensor 25, the transparent fluid 76 flows along the inner wall 74 of the spherical housing 38 to regain equilibrium. The rate of fluid movement and hence the response speed of the orientation sensor 25 is related to the viscosity of the transparent fluid 76. Fluid having a low viscosity flows more readily than a fluid with a higher viscosity, which would translate into faster cursor movement on display screen 18. A higher viscosity fluid provides a damping effect.

In the preferred embodiment, the transparent fluid 76 is castor oil, which has an absolute viscosity of 986 centipoise at 20 degrees Centigrade. Mineral oil (absolute viscosity=70.4 centipoise) has also been used effectively but results in a faster response speed.

When the spherical housing is sealed, air 78 is trapped therein, above the level of the transparent fluid 76. As light emitted from the LEDs 68, 70 strikes the boundary between the air 78 and the transparent fluid 76, a certain part of the light beam is reflected upwardly, but in general a much larger part passes into the transparent fluid 76 at an angle of refraction. The index of refraction of most transparent liquids fall in the range of 1.35 to 1.55. It is desirable to choose a transparent liquid with the highest practical index of refraction to provide the greatest angles of refraction and therefore the greatest signal differentials. Castol oil, used in the preferred embodiment, has an index of refraction of 1.477.

Figure 7B:
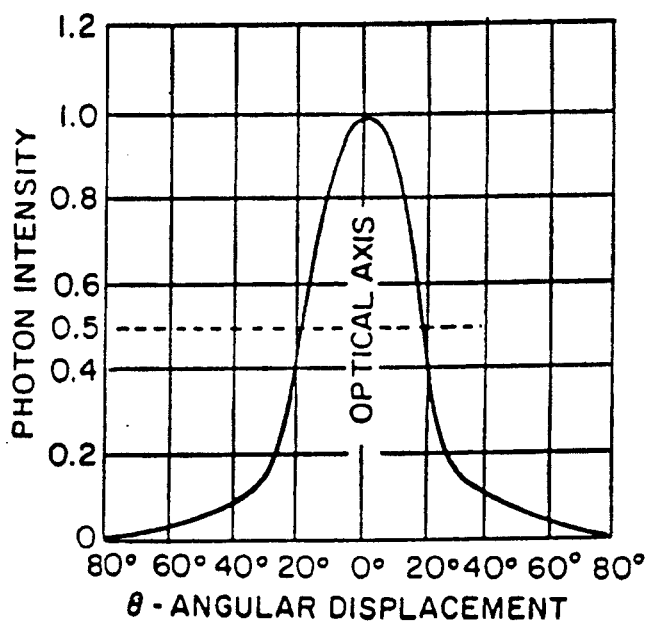
FIG. 7B illustrates, graphically, the relationship between the photon intensity of the beam and displacement angle for the LED shown in FIG. 7A.
Figure 7A:
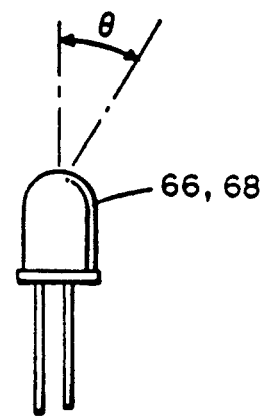
FIG. 7A illustrates an LED, showing in particular the displacement angle from the optical axis of the emitted beam.

The LEDs 68, 70 and the phototransistors 74, 72 are spectrally and mechanically matched. In the preferred embodiment, Type TIL39 light emitting diodes and Type TIL78 phototransistors (both manufactured by Texas Instruments, Inc. of Dallas, Tex.) are used. FIG. 7A and FIG. 7B illustrates the typical optical parameters of the LEDs 68, 70 showing in particular how photon intensity varies with angular displacement from the optical axis of the device. It is significant to note that photon intensity follows a Gaussian-shaped curve. At an angle 20 degrees from the optical axis, photon intensity decreases to 50 percent of the maximum value at the optical axis. The phototransistors 74, 72 have similar characteristics in the sensing of light.

FIG. 8 illustrates the functioning of a single LED/phototransistor pair at various angles of rotation with respect to the vertical axis 79. The LED 70 and photodetector 72 are disposed on the same beam axis 80 which passes through the center point of the spherical housing 38.

Figures 8A, 8B, 8C:
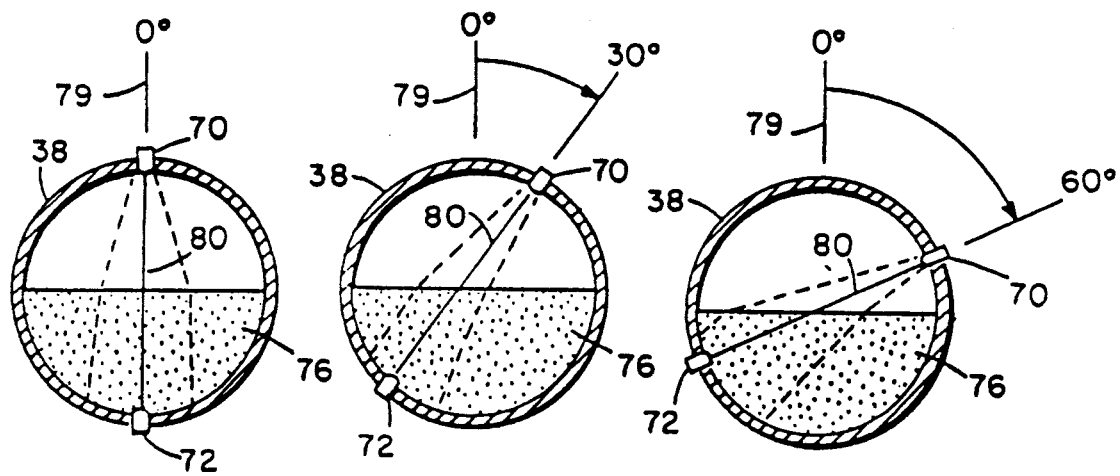
FIGS. 8A, 8B, 8C illustrate the functioning of a single LED/phototransistor pair at various angles of rotation.

In FIG. 8a, the beam axis 80 is perpendicular to the surface of the transparent fluid 76 and the angle of refraction is zero. The light beam, represented in the FIG. 8 as the region within the dotted lines, is refracted inwardly toward the phototransistor 72, producing a collimating effect. The maximum amount of light is received by the phototransistor 72.

In FIG. 8b, the spherical housing 38 has been rotated 30 degrees from the vertical axis 79, and the light beam is refracted downwardly from the beam axis 80 which passes through the LED/phototransistor pair. The refracted signal detected by the phototransistor 72 is decreased.

Finally, in FIG. 8c, the spherical housing 38 has been rotated 60 degrees from the vertical axis 79. The angle of refraction is greater still, and the refracted signal detected by the phototransistor is decreased further.

Figure 9:
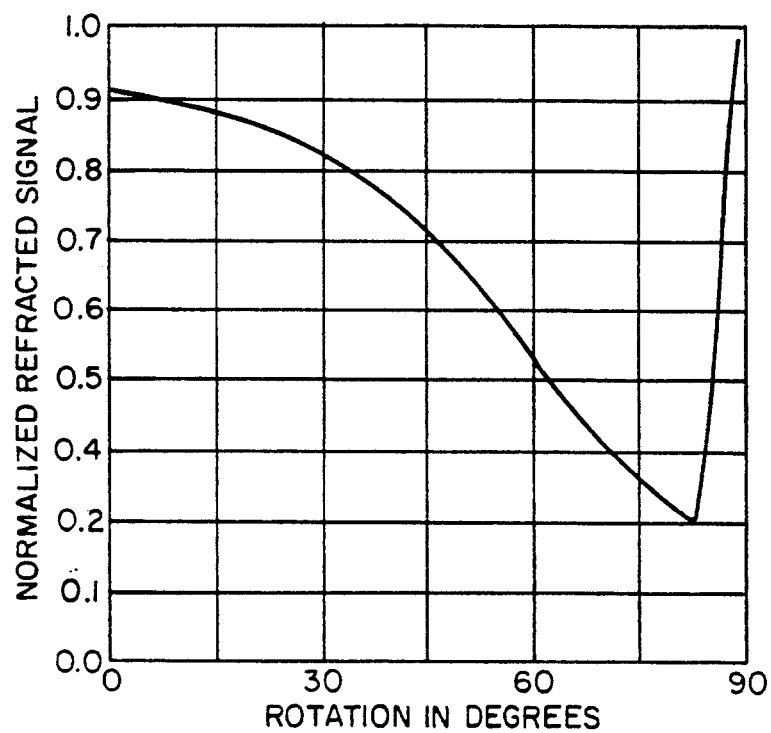
FIG. 9 illustrates, graphically, the relationship between the angle of rotation and the magnitude of the refracted signal for the LED/phototransistor pair shown in FIG. 8.

This relationship can be more clearly seen in FIG. 9, which plots the angle of rotation against the refracted signal, as detected by the phototransistor 72. As the spherical housing 38 is rotated with respect to the vertical axis 79, the angle from the vertical axis 79 to the beam axis 80 will increase, and the refraction angle of the light beam will also increase, though not to the same degree. The signal detected by the phototransistor decreases until the angle of rotation from the vertical axis 79 approaches 90 degrees, where the light beam passes from the LED 70 to the phototransistor 72 on the surface of the transparent fluid 76, and the signal intensity increases to maximum.

Figure 10:
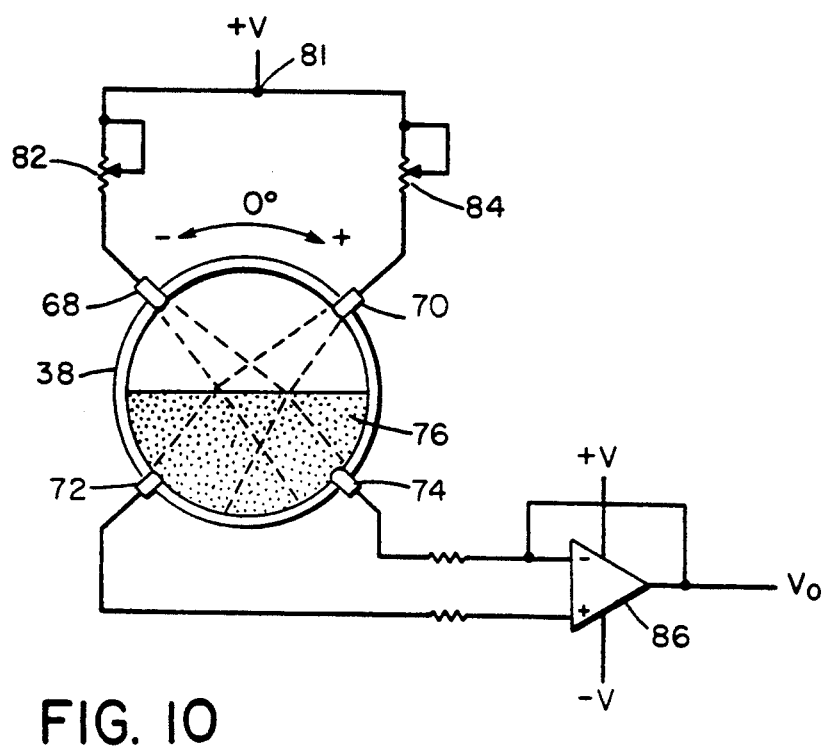
FIG. 10 illustrates the electrical function of a single axis of the present invention, showing in particular the analog circuitry associated with that axis.

FIG. 10 illustrates one axis of the present invention, showing in particular the analog electrical circuitry associated with that axis. A single voltage source 81 supplies the LEDs 68, 70, and the light intensity is balanced by means of individual potentiometers 82, 84.

The outputs of the phototransistors 72, 74 are applied to a differential amplifier 86. In FIG. 10, the LEDs 68, 70 are 45 degrees above the surface of the transparent fluid 76, and the output of the differential amplifier 86 is zero because the output voltages of the phototransistors 72, 74 are balanced at 50 percent of their maximum value. When the spherical housing 38 is rotated in the positive or negative direction, the output voltage of the differential amplifier 86 varies in the positive or negative direction with the magnitude indicating the angle of rotation.

Figure 11:
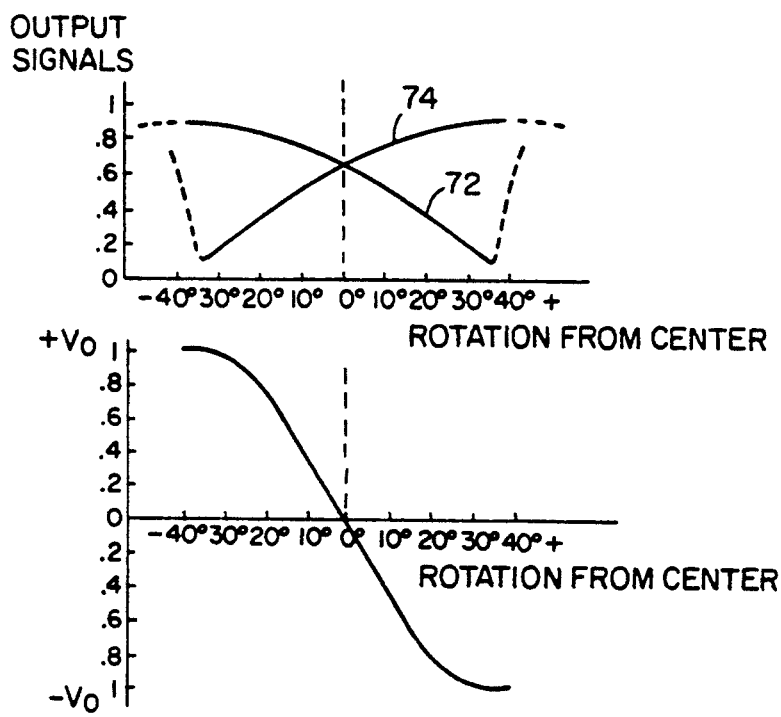
FIG. 11 illustrates, graphically, the relationship between the angle of rotation of the spherical housing and the output of the differential amplifier shown in FIG. 10.

FIG. 11 shows the relationship between the angle of rotation of the spherical housing 38 and the output of the differential amplifier 86. The orientation sensor 25 detects rotation angles from zero to 45 degrees in either the negative or positive direction as defined in FIG. 10.

Figure 12:
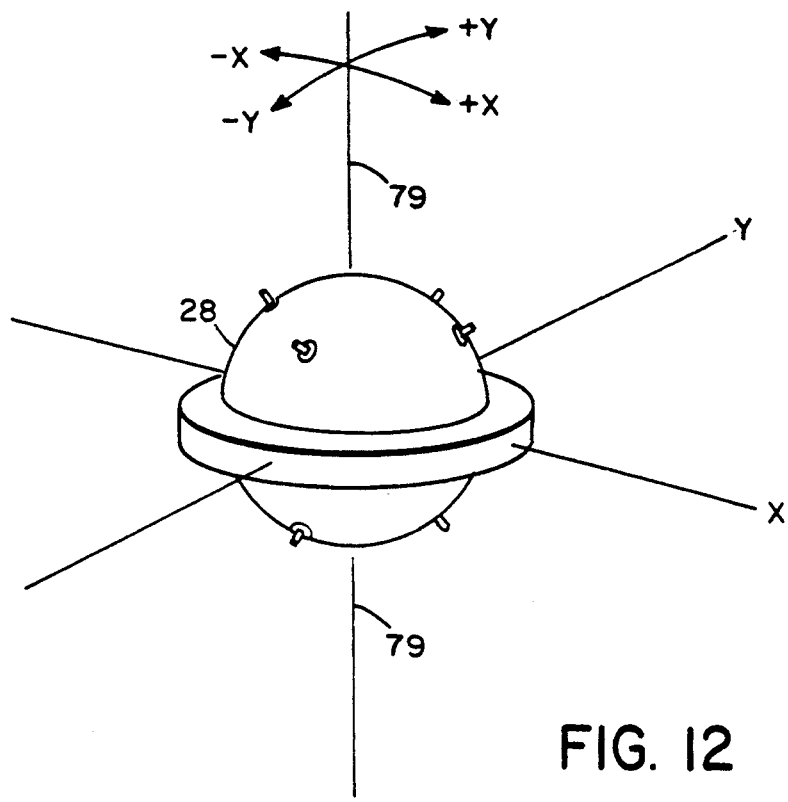
FIG. 12 illustrates the orientation of the present invention in the X and Y axes.

FIG. 12 depicts the orientation sensor 25 operating in two axes. The orientation sensor 25 detects rotation in any direction from the vertical axis 79. Furthermore, there is no unwanted interaction between the X and Y axis. If rotation is solely in the direction of the X axis, for example, the Y axis output of the differential amplifier 86 will remain zero because both phototransistors 72, 74 will detect an equal decrease in light intensity.

Figure 13:
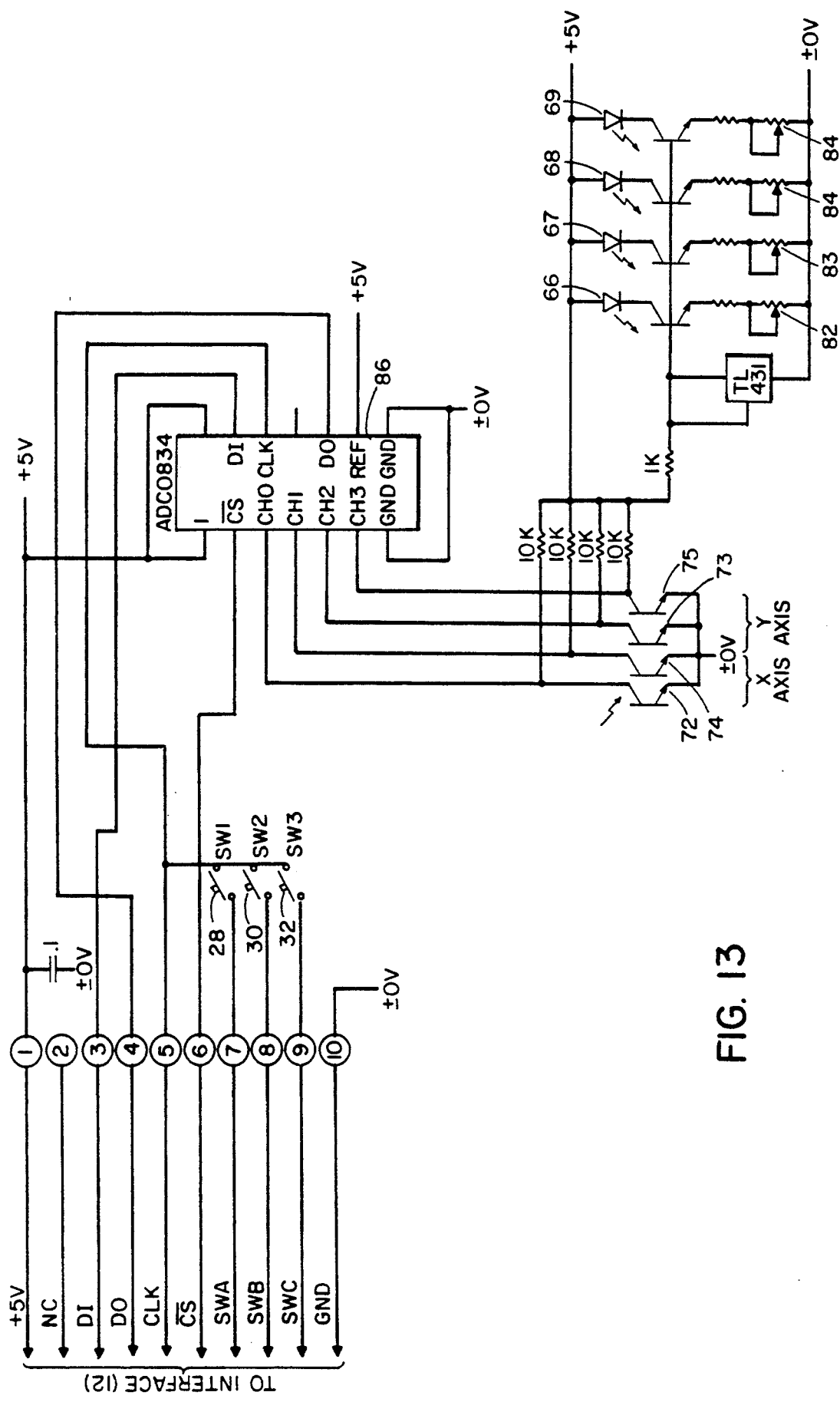
FIG. 13 illustrates the electrical circuitry of the computer input device of the present invention.

Turning now to FIG. 13, the electrical circuitry of the present invention is shown in more detail. Each of the four LED's 66–69 has an associated adjustment potentiometer 82–85, for adjustment of LED intensity. The LED's 66–69 are independently adjustable to provide a means for calibrating the orientation sensor 25 at the time of manufacture and testing to overcome problems caused by tolerance variations in each LED/phototransistor pair.

The LED's 66–69 and the matched phototransistor pairs 72–75 provide input to a four-channel serial analog-to-digital converter 86. In the preferred embodiment, the IC chosen is a Texas Instruments type ADC0834. The analog-to-digital converter employs a data comparator structure to differentially compare the input signals in pairs and output data bytes with eight-bit resolution which indicate the resultant magnitude and sign of the compared signals. Clock (CLK) and chip strobe (CS) are received from the interface 12 for scanning orientation sensor 25. Data is output serially on line DO in response to a chip strobe (CS). The SELECT and RETURN switches 28, 30 and the trigger switch 32 are also scanned by the interface 12.

Figure 14:
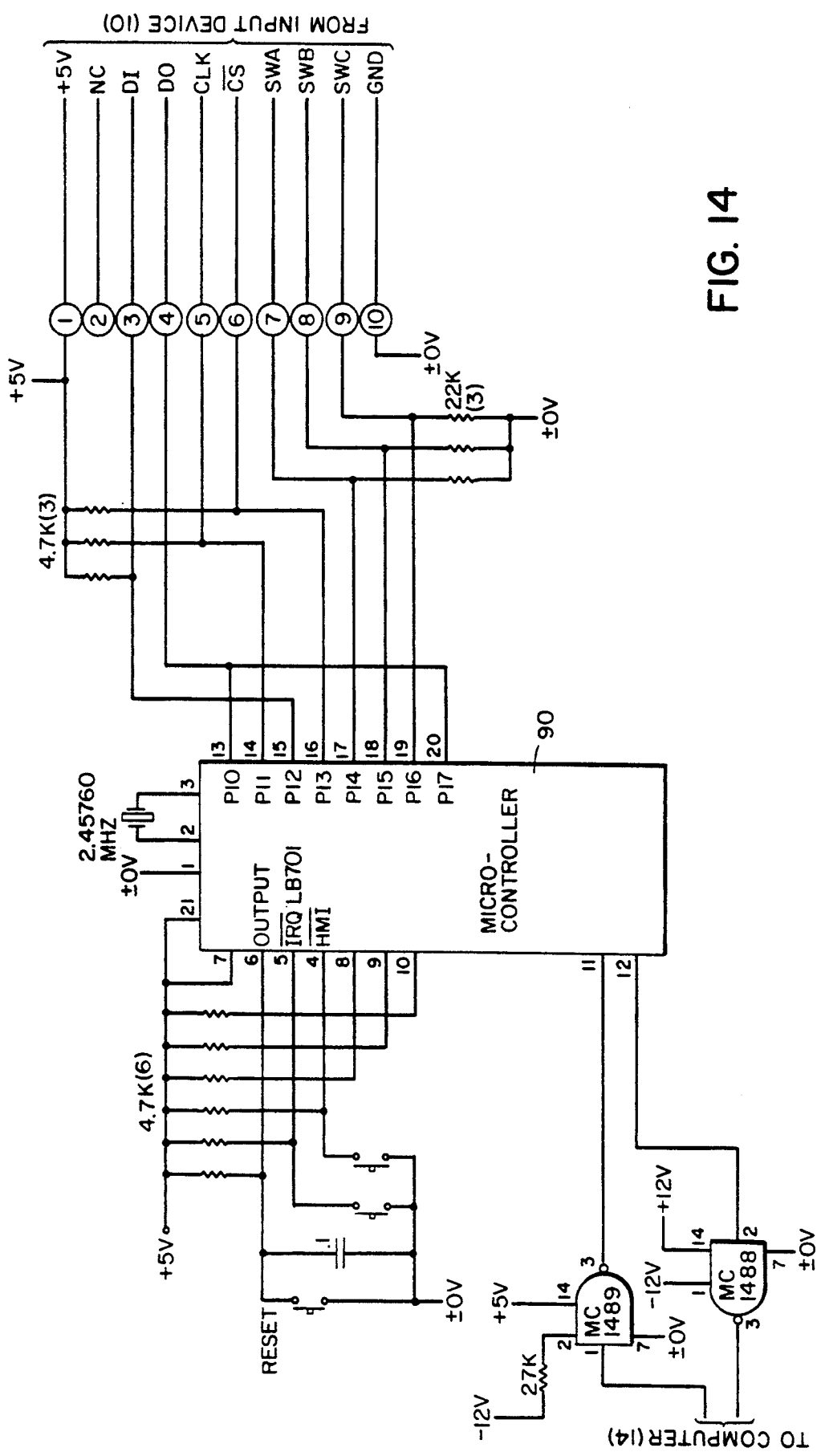
FIG. 14 illustrates the electrical circuitry of the interface used with the present invention.

FIG. 14 illustrates the major circuitry of the interface 12. The microcontroller 90 is a Motorola type 68701, which has a microprogram to calculate the X and Y positions of the orientation sensor 25, format the position data to simulate the operation of a graphics input device, and present the data to the computer 14.

Figure 15:
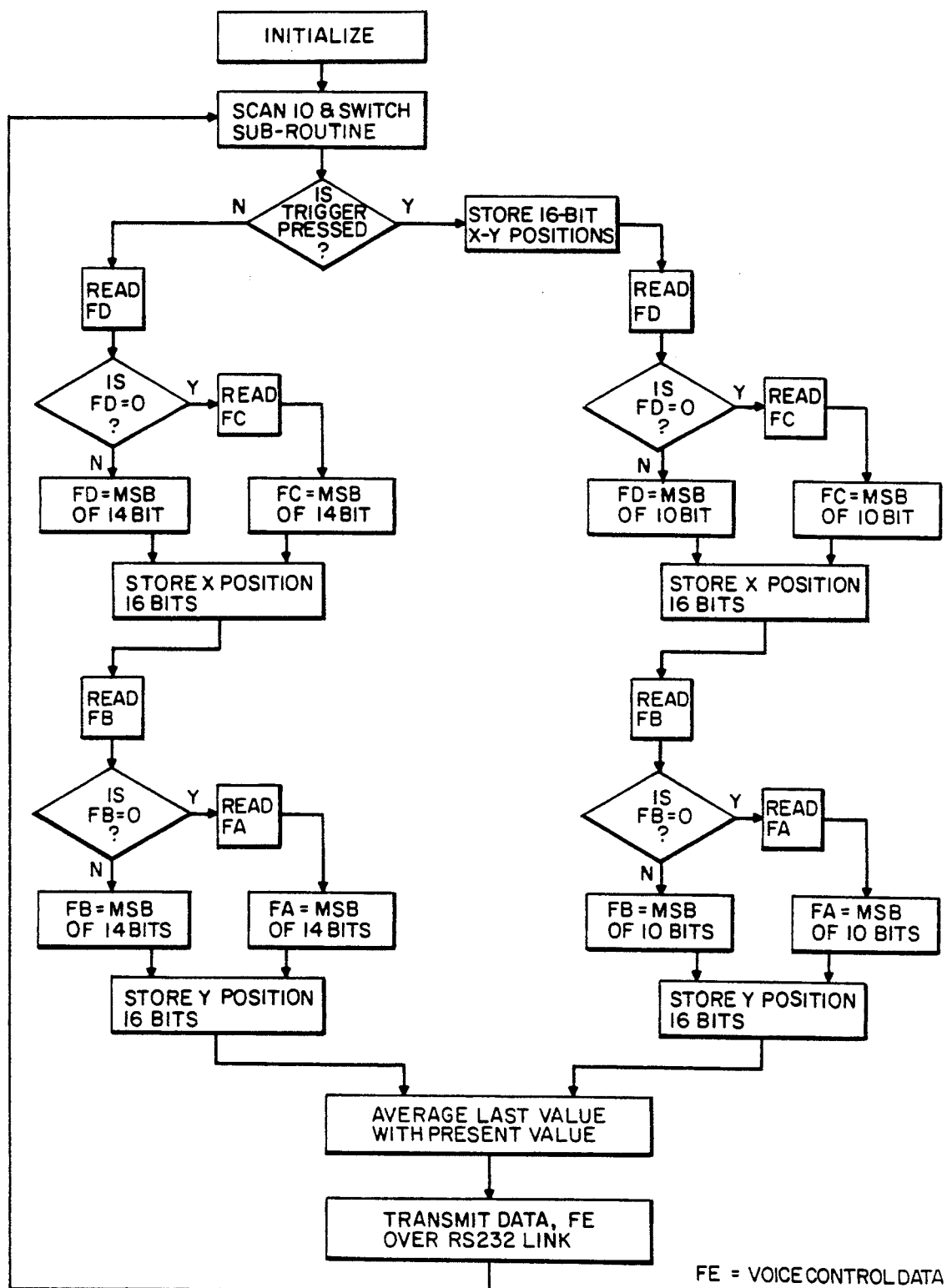
FIG. 15 shows, in flow chart form, the microcontroller microprogram of the interface used with the present invention.

Referring now to FIG. 15, a flow chart is shown of the microcontroller 90 microprogram. Generally, upon initialization, the microprogram causes the microcontroller 90 to monitor computer input device 10 including the positions of the SELECT and RETURN switches 28, 30 (data FE), and the trigger switch 32 (slow motion). If the trigger switch 32 is not activated, the microcontroller reads the eight bit positive X-axis byte (FD) or, if zero, the negative X-axis position byte (FC) and stores the X position data as the most significant of 14 bits. Upon calculating X, the microprocessor 90 calculates the Y-axis positional data (FB & FA) the same way. The stored X and Y position words are then averaged with the present X an Y values, and the result is transmitted over an RS-232 link to the computer 14, along with the switch position data FE.

As long as the trigger switch 32 is activated, a second subroutine calculates the X-axis and Y-axis positional data the same as before, except the X and Y position data are stored as the most significant of 10 bits, instead of 14 bits. This has the effect of slowing down cursor movement on display screen 18.

In operation of computer input device 10, an operator, wishing to effect cursor movement on the display screen 18, engages the SELECT switch 28. The operator then tilts the computer input device, front-to-back or side-to-side corresponding to rotation toward the X-axis or Y-axis, shown particulary in FIG. 12. A forward tilting rotation causes a downward movement of the cursor on display screen 18. A backward tilting rotation causes an upward movement of the cursor. A rotation to the left causes a leftward movement of the cursor, and a rotation toward the right causes a rightward movement of the cursor. The speed of cursor movement corresponds to the rotation angle of the computer input device 25. Should the operator wish to slow down movement of the cursor, to make more finely controlled movements, the operator engages the trigger switch 32. As long as the trigger switch is engaged, the cursor will move in apparent slow motion.

Figure 16:
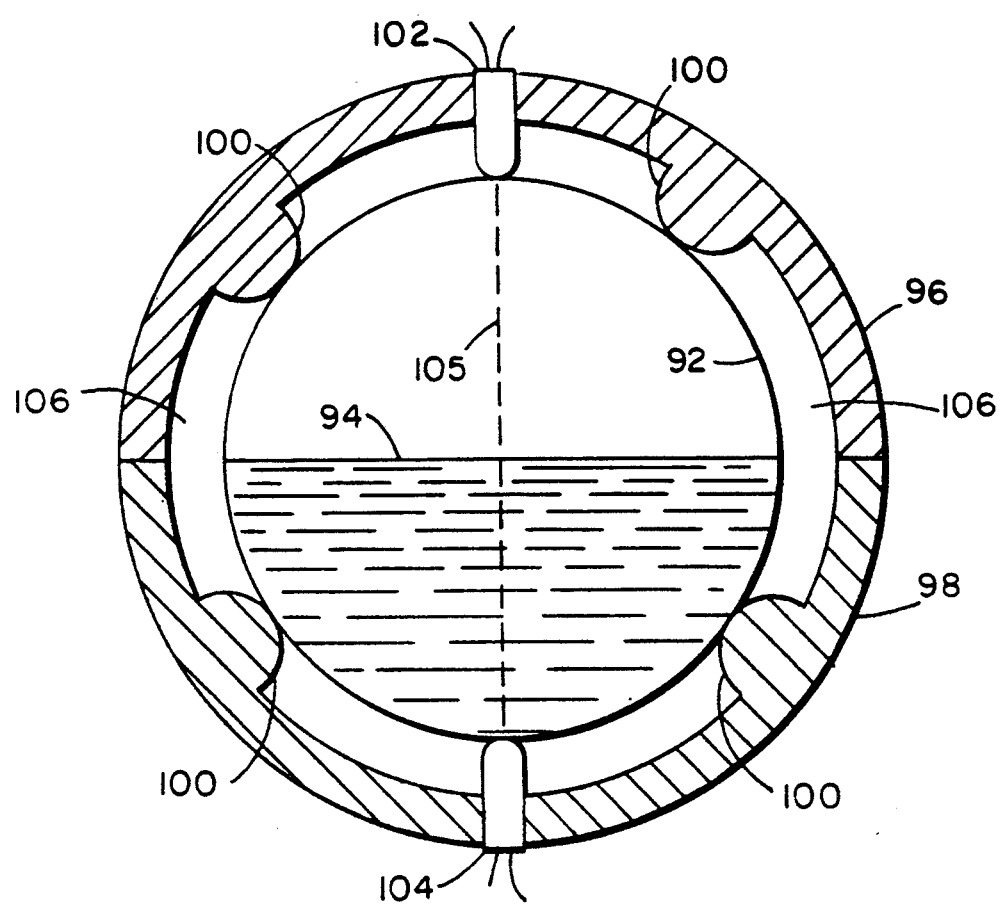
FIG. 16 illustrates an alternative embodiment of the present invention.

In an alternative embodiment shown particulary in FIG. 16, a hollow transparent sphere 92 is half-filled with transparent fluid 94. The hollow sphere 92 in disposed within an optically opaque spherical enclosure comprising upper and lower hemispherical members 96, 98. The upper and lower hemispherical members 96, 98 include support projections 100 for supporting the hollow sphere 92. At least one light source 102 and one optical detector 104 are disposed in the upper and lower hemispherical members 96, 98 along an axis passing through the center of the transparent sphere 92. The light source 102 and the optical detector 104 are in contact with the hollow sphere 92. An air gap 106 separates the hollow sphere 92 from the upper and lower hemispherical members 96, 98.

In view of the above, it will be seen that the several objects of the present invention are readily achieved and other advantageous results attained.

Obviously many modifications and variations of the present invention are possible in light of the above teachings, without departing from the spirit and scope of the invention. Although the computer input device is designed to simulate a graphics input device, the principles of the present invention are applicable to other computer input devices types. The novel orientation sensor disclosed herein is also applicable to a wide range of uses, including automatic leveling devices, robotic control systems, and appliances for the handicapped. In view of this, it is understood that the above description is illustrative rather than limiting.

What is claimed is:

1. A graphics system for displaying a cursor and providing controlled movement of the cursor, comprising:

a display terminal unit having a display screen;

a computer, coupled to said display terminal unit, programmed to control the position of a cursor on the display screen in response to cursor control signals;

a computer input device coupled to said computer, the computer input device sensing angular orientation at the input device independently of the computer;

the computer input device generating electrical signals representative of the angular orientation of the input device with respect to a vertical axis passing therethrough for a continuous range of angles and for a continuous range of directions; and means, coupled to said computer, for generating cursor control signals for controlling the position of a cursor in response to said electrical signals.

2. A system input device as recited in claim 1, wherein said computer input device includes command switch means for initiating computer command signals.

3. A system as recited in claim 1, wherein said computer input device includes trigger switch means, electrically coupled to the interface means, for initiating a subprogram for controlling cursor speed.

4. A system as recited in claim 1, wherein said input device includes:

a housing having a circular cross section and center point in a plane which includes said vertical axis;

a first light source and a first photodetector mounted opposingly in the plane of the circular cross section of the housing on a first axis extending through the center point of the circular cross section;

a second light source and a second photodetector mounted opposingly in the plane of the circular cross section of the housing on a second axis extending through the center point of the circular cross section, the second axis being displaced from the first axis;

a liquid medium and a gaseous medium within the housing, said media having a boundary surface therebetween; and differential amplifier means, coupled to said photodetector;

whereby the output of the differential amplifier is representative of the magnitude and direction of angular displacement of the input device within said plane.

5. A system as recited in claim 4, wherein the boundary surface between the liquid medium and gaseous medium intersects the center point of the circular cross section.

6. A system as recited in claim 4, wherein said second axis is displaced 90 degrees from said first axis.

7. A system as recited in claim 4, wherein said housing is spherical.

8. A system as recited in claim 4, wherein said light sources are light emitting diodes.

9. A system as recited in claim 4 wherein said photodetectors are phototransistors.

10. A system as recited in claim 4, wherein said liquid medium is castor oil.

11. A system as recited in claim 4, wherein said liquid medium is mineral oil.

12. A computer input device, comprising:

a housing;

sensor means, within the housing, for sensing the magnitude and direction of angular displacement of the housing for a continuous range of angles and for a continuous range of directions relative to a vertical axis and generating electrical signals representative thereof; and interface means, coupled to the sensor means, for translating said electrical signals into position control signals for transmission to a computer.

13. An input device as recited in claim 12, further including switch means for initiating computer command signals.

14. An input device as recited in claim 12, further including trigger switch means, electrically coupled to said interface means, for initiating a subprogram for controlling cursor speed.

15. An input device as recited in claim 12, wherein said sensor means includes:
- a sensor housing having a circular cross section and center point in a plane which includes said vertical axis;
- a first light source and a first photodetector mounted opposingly in the plane of the circular cross section of the housing on a first axis extending through the center point of the circular cross section;
- a second light source and a second photodetector mounted opposingly in the plane of the circular cross section of the housing on a second axis extending through the center point of the circular cross section, the second axis being displaced from the first axis;
- a liquid medium and a gaseous medium within the sensor housing, said media having a boundary surface therebetween; and
- differential amplifier means, coupled to said photodetectors;
- whereby the output of the differential amplifier is representative of the magnitude and direction of angular displacement of the input device within said plane.

16. An input device as recited in claim 15, wherein the boundary surface between the liquid medium and gaseous medium intersects the center point of the circular cross section.

17. An input device as recited in claim 15, wherein said second axis is displaced 90 degrees from said first axis.

18. An input device as recited in claim 15, wherein said housing is spherical.

19. An input device as recited in claim 15, wherein said light sources are light emitting diodes.

20. An input device as recited in claim 15 wherein said photodetectors are phototransistors.

21. An input device as recited in claim 15, wherein said liquid medium is castor oil.

22. An input device as recited in claim 15, wherein said liquid medium is mineral oil.

23. An input device as recited in claim 12, wherein said sensor means includes:
- a spherical housing having a center point defined therein which includes said vertical axis;
- four light source/photodetector pairs, each pair mounted opposingly on an axis extending through the center point of the spherical housing and evenly spaced therearound;
- said light source/photodetector pairs being arranged, within said spherical housing, with the light sources in the upper hemisphere and the photodetectors in the lower hemisphere;
- said housing having a first vertical plane defined therein which includes two light source/photodetector pairs, and a second vertical plane defined therein which includes two other pairs, the planes intersecting orthogonally at the center point;
- a liquid medium and a gaseous medium, within the housing, having a boundary surface therebetween which intersects the center point of the circular cross section; and
- first differential amplifier means, coupled to the photodetector in the first plane;
- second differential amplifier means, coupled to the photodetectors in the second plane;
- whereby the output of the first and second differential amplifiers is representative of the magnitude and direction of angular displacement of the spherical housing in any direction with respect to said vertical axis.

24. A method for controlling the position of a cursor on a display screen, comprising the steps of:
- sensing the magnitude and direction of angular displacement of a user-movable housing for a continuous range of angles with respect to a reference axis passing through said housing for a continuous range of directions;
- generating electrical signals representative of said magnitude and direction; and
- translating said electrical signals into digital cursor position control signals for transmission to a computer.

* * * * *